(12) United States Patent
Lais

(10) Patent No.: US 6,392,677 B1
(45) Date of Patent: May 21, 2002

(54) TACHOGRAPH HAVING A PRINTING DEVICE

(75) Inventor: Norbert Lais, Villingen-Schwenningen (DE)

(73) Assignee: Mannesmann VDO AG, Villingen-Schwenningen (DE)

( * ) Notice: Subject to any disclaimer, the term of this patent is extended or adjusted under 35 U.S.C. 154(b) by 0 days.

(21) Appl. No.: 09/718,560

(22) Filed: Nov. 22, 2000

(30) Foreign Application Priority Data

Nov. 27, 1999 (DE) ..................................... 299 20 901 U

(51) Int. Cl.[7] ................................. G01D 9/00; B41J 2/325
(52) U.S. Cl. .................................................. 347/33 D
(58) Field of Search ................................ 347/218, 220, 347/222, 219, 104; 346/76.1, 33 D, 121, 62, 104, 3, 134; 340/441; 73/117.3, 431; 400/619

(56) References Cited

U.S. PATENT DOCUMENTS

| | | | | |
|---|---|---|---|---|
| 4,331,965 A | * | 5/1982 | Schultze | 346/121 |
| 4,507,963 A | * | 4/1985 | Donner et al. | 73/431 |
| 4,644,368 A | * | 2/1987 | Mutz | 346/33 D |
| 4,782,691 A | * | 11/1988 | Clish | 73/117.3 |
| 5,463,373 A | * | 10/1995 | Widl et al. | 340/441 |
| 5,533,821 A | * | 7/1996 | Awai et al. | 347/219 |
| 5,953,035 A | * | 9/1999 | Watanabe et al. | 347/104 |

* cited by examiner

*Primary Examiner*—N. Le
*Assistant Examiner*—K. Feggins
(74) *Attorney, Agent, or Firm*—Sidley Austin Brown & Wood, LLP

(57) ABSTRACT

In the proposed tachograph, a thermal print head (29) and a feed roller (35) are spatially separated from one another. A starting section (38) of the printing material (32), which section projects by a suitable length, is automatically clamped between the thermal print head (29) and the feed roller (35) when the drawer (28) closes. One of the closure gaps of the drawer (28) is designed as an output slot (24) for the printed documents produced.

21 Claims, 5 Drawing Sheets

TACHOGRAPH HAVING A PRINTING DEVICE

Figure 1:
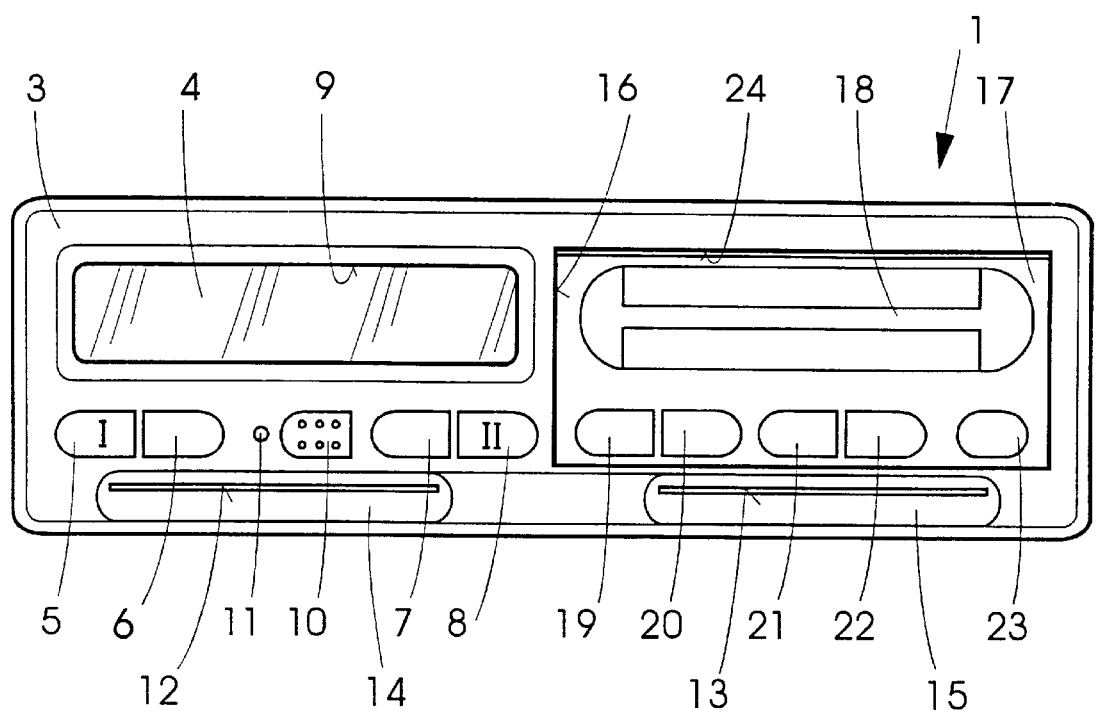

The innovation relates to a tachograph having a printing device, which has a thermal print head and a support, which can be moved out of the front side of the housing of the tachograph, for reloading a ribbon which forms the stock of printing material, and a feed roller which is actively connected, in a force-fitting manner, to the thermal print head, with the printing material between them and is driven by a drive mechanism.

Tachographs which are not designed for the use of record charts as recording media, but rather in which the driving and working time data are stored in suitably designed bulk memories, require suitable printing devices for documentation in the form of a visually readable document, and these devices have to be arranged inside the tachographs since in a driver's cab of a commercial vehicle there is not generally enough space for the installation of an independent printer which corresponds with the tachograph.

One of the advantages of these tachographs which record by purely electronic means, namely a higher degree of flexibility in terms of where it is arranged within the area which is still accessible to the driver, if, by contrast to the use of plug-in card-like printing substrates, a printing principle with strip-like or ribbon-like printing material is to be used, is restricted in that it is necessary for the printing device in question to be loaded with the stock of printing material and the starting section of the printing material has to be moved into the printing position. An additional difficulty is that tachographs are generally designed as built-in appliances and are therefore fitted with a flush front wall, meaning that access for reloading the stock of printing material is only possible from the front side, using a drawer or a support which can fold or pivot open on the front side.

Therefore, the object of the present innovation was to arrange the printing device of the generic type in such a manner in a tachograph that the handling operations involved in reloading the printing-material ribbon and moving the starting section of the printing material into the printing position can be carried out relatively easily in all possible installation positions of the tachograph.

The solution to the object is described by claim 1. Further advantageous configurations and exemplary embodiments of the innovation are given in the subclaims.

The decisive advantage which is achieved in all the variant embodiments described with the printing device formed in a tachograph according to the innovation is in particular that, after the ribbon has been inserted into the receptacle provided for this purpose and the receptacle, for example a drawer, has subsequently been closed, the printing material automatically moves into the printing and feed position between the thermal print head and the feed roller, which additionally also serves as an abutment. Beforehand, it is merely necessary to ensure that a sufficiently long starting section or printing material is projecting from or has been pulled off the ribbon. In this arrangement, an important aspect of the solution according to the innovation is that the closure gap or a section of the closure gap between the front panel of the drawer and the front wall of the tachograph, which section is parallel to the feed roller, serves as a guide for the printing material or as an output slot for the printed documents produced, at least one of the outer edges of the output slot expediently being designed as a tear-off edge. In other words, the thermal print head and the feed roller are arranged and associated with one another in such a manner that the closure gap can take over responsibility for guiding the printing material which to be advanced by the feed roller. This guidance is formed as a result of the printing material being interposed when the drawer slides closed. At the same time as the drawer slides closed, the thermal print head and the feed roller are actively connected, and it is possible to precisely secure the position of the feed roller in the printing position by means of a suitable clamping device which is preferably associated with the bearing journals of the feed roller.

The innovation therefore offers the advantage that a ribbon can be inserted into the receptacle provided and the printing material can then be moved into the printing position even without a direct view into or onto the drawer.

A further advantage to be emphasized is that the thermal print head can be arranged so that it is largely protected inside the housing of the tachograph or its front wall and therefore the multiwire electrical connection of the thermal print head does not have to be moved. By contrast, if the drive mechanism which drives the feed roller is assigned as a unit to the drawer, significantly fewer flexible lines are required. Moreover, with this type of arrangement, the gear elements between the driving motor and the feed roller are permanently engaged and the drive mechanism can be encapsulated within the drawer so as to be protected against access. Naturally, if certain drawbacks are accepted, the innovation can also be implemented with the arrangement of thermal print head and feed roller reversed or with an arrangement of the drive mechanism in which it is necessary for the drive connection of the feed roller to be engaged and disengaged.

Furthermore, on account of the spatial arrangement of the printer components, the solution which has been discovered offers improved utilization of space compared to the use of a commercially available printing unit, i.e. the solution is apparatus-specific or apparatus-optimized. Moreover, there is no need for additional provisions for eliminating paper jams. However, the decisive factor is that there is no need for the start of the ribbon to be threaded between thermal print head and feed roller, making direct observation and high levels of care unnecessary.

Further advantages of the innovation will emerge from the descriptions of the individual exemplary embodiments.

Figure 2:
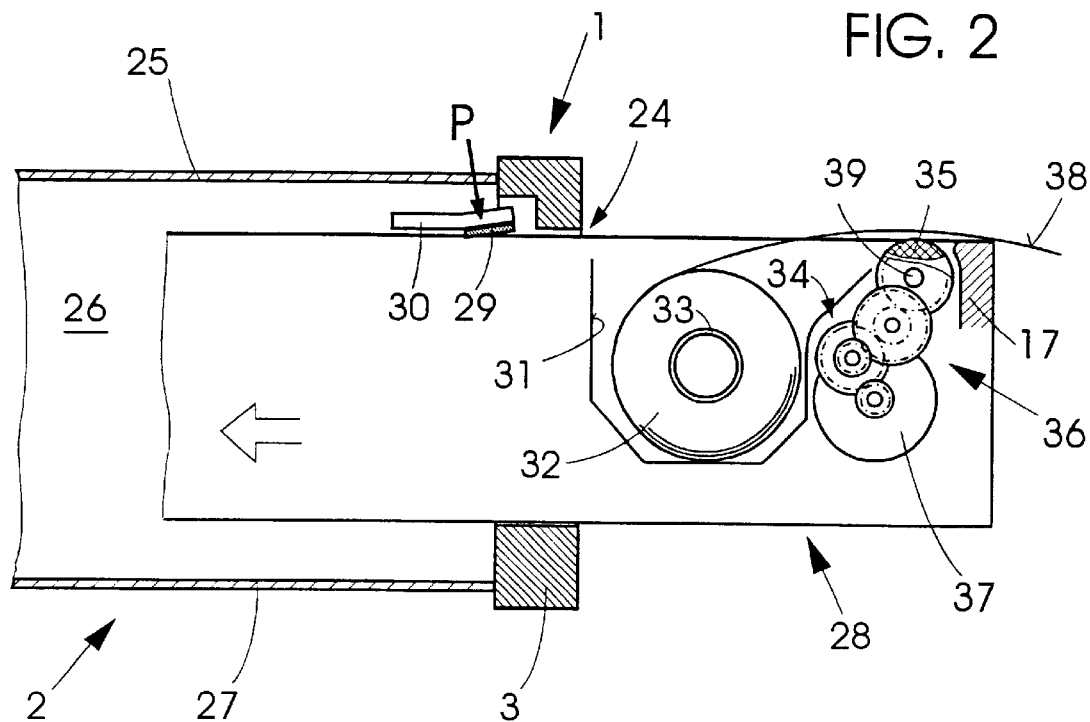
Figure 3:
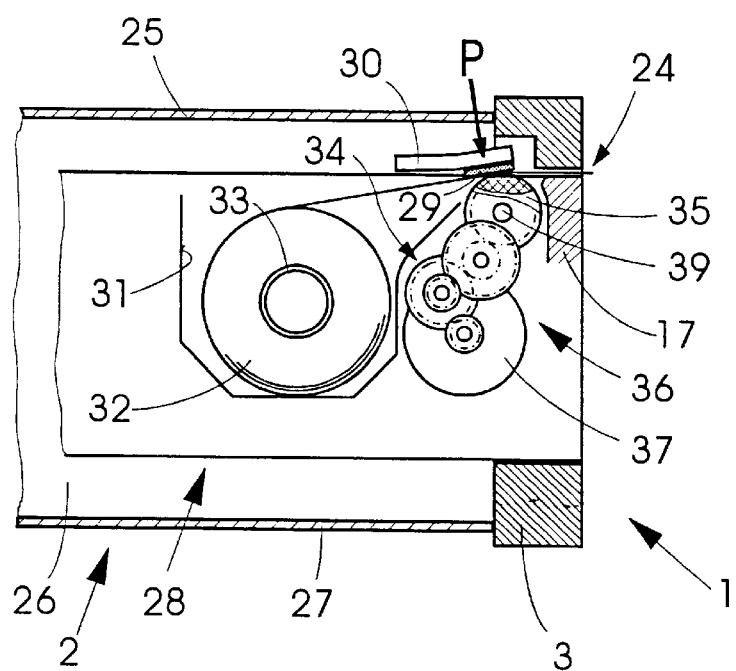
Figure 4:
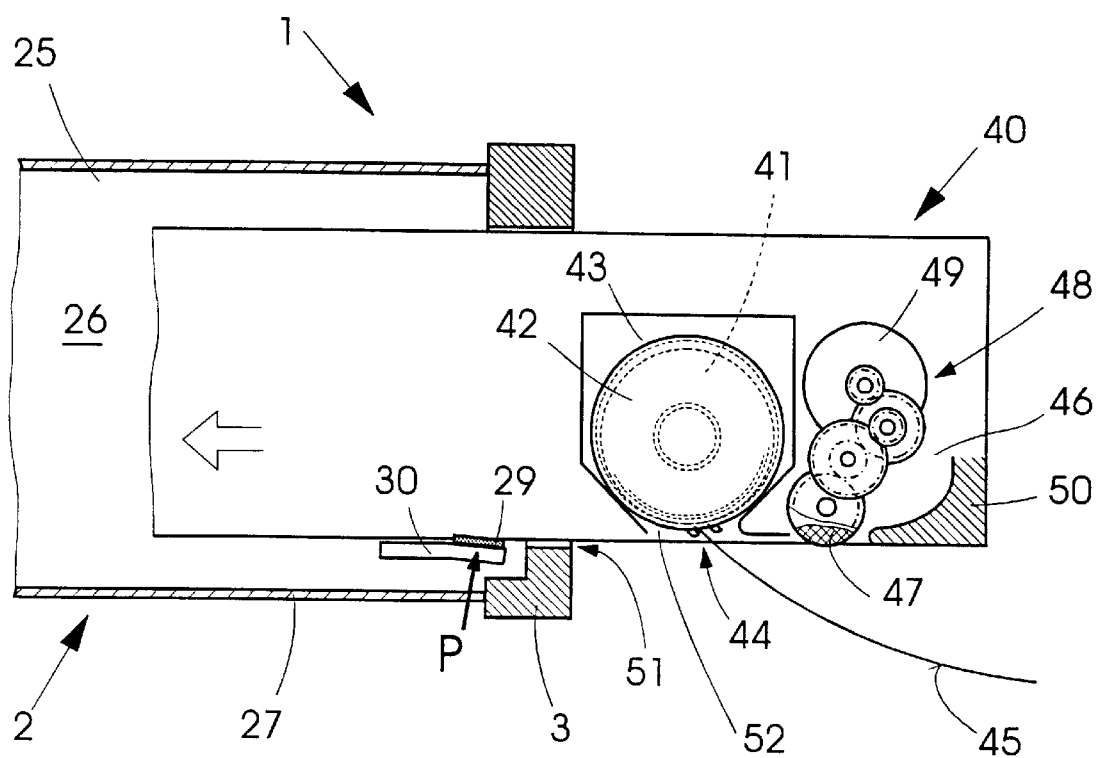
Figure 5:
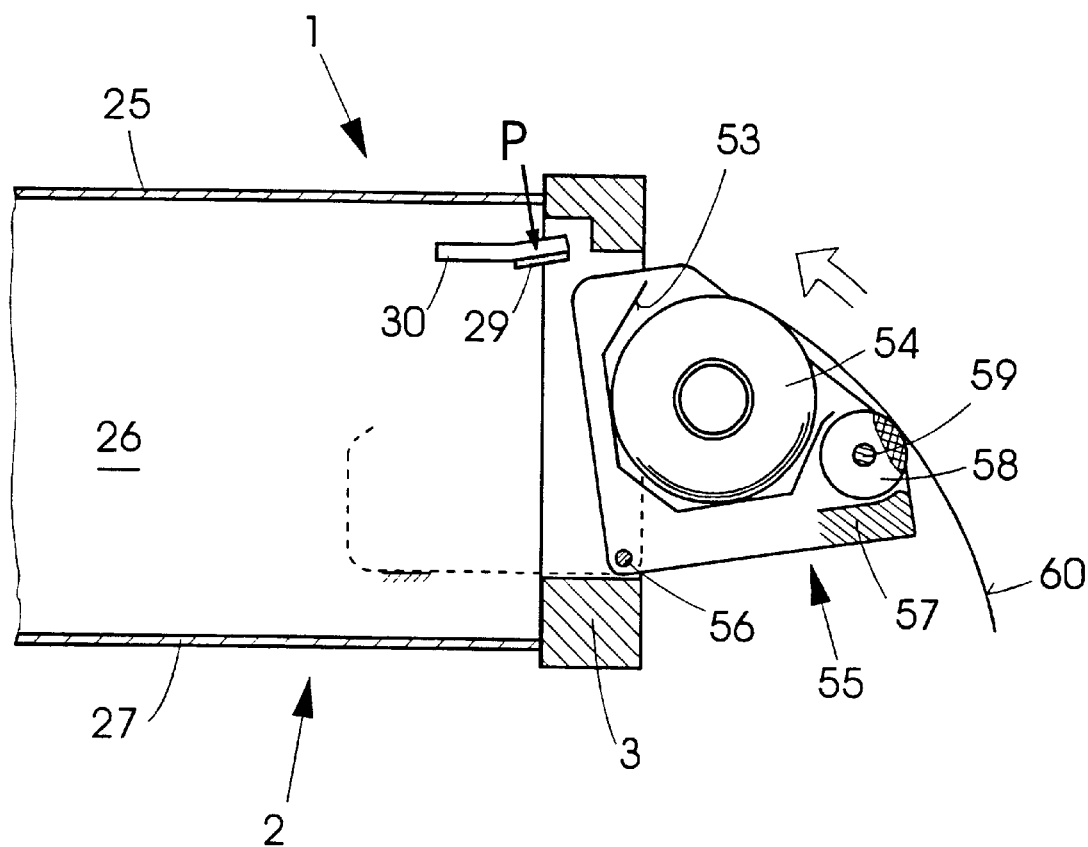
Figure 6:
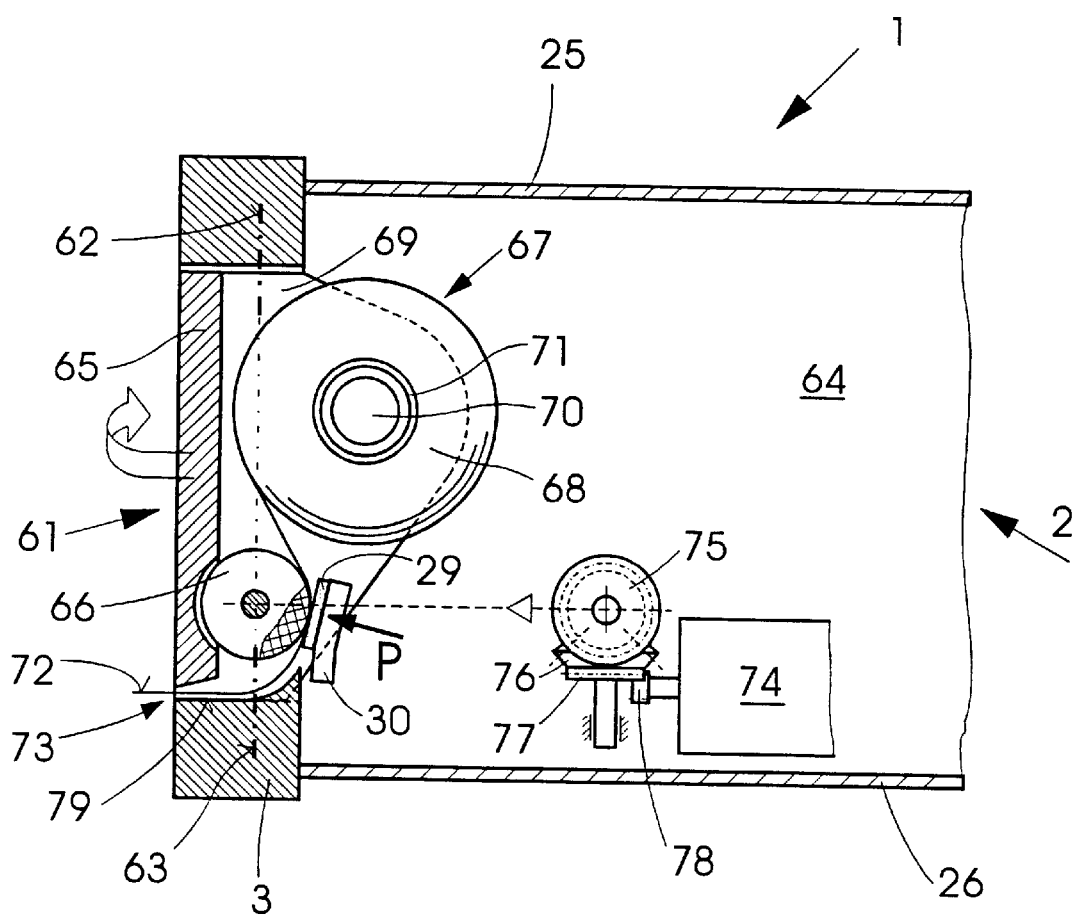

The innovation is explained below with reference to drawings, in which:

FIG. 1 shows a front view of a shallow, cuboidal tachograph,

FIG. 2 shows a diagrammatic side view of the components of the tachograph shown in FIG. 1 which interact as a printing device, the support being shown as a sliding drawer, FIG. 3 shows a similar view to FIG. 2, with the sliding drawer closed and the thermal print head and feed roller actively connected, FIG. 4 shows a diagrammatic side view of the components of a variant of the tachograph shown in FIG. 2 which interact as a printing device, in which variant the receptacle for the ribbon is accessible at right angles to a side wall of the sliding drawer, FIG. 5 shows an outline sketch of a further exemplary embodiment of a tachograph which is designed according to the innovation and has a receptacle for the ribbon formed in a fold-out drawer, FIG. 6 shows a diagrammatic illustration of an exemplary embodiment of a tachograph having a receptacle for the ribbon which is designed on a swing-out drawer.

The tachograph 1 which is illustrated in FIG. 1 and is designed as a built-in appliance has a cover or front wall 3 which is connected to a cuboidal housing 2 and which holds a display 4 and buttons 5, 6 and 7, 8. In this case, the buttons 5 and 8 are used for registering driver and second driver, the buttons 6 and 7 are used to release the respective data cards. A window section associated with the display 4 is denoted by 9. A spring-mounted closure element 10 covers a plug socket; 11 represents a warning lamp. Slots 12 and 13 are used for introducing data cards associated with the drivers, the slots 12, 13 being formed in the base of in each case funnel-like recesses 14 and 15. Furthermore, in the front wall 3 there is a cutout 16 which is covered by a front panel 17 which is designed to fit into the front surface of the front wall 3 of the tachograph 1, in particular so that the surfaces are flush. The front panel 17 is part of a support of a printer assembly which can be moved out of the tachograph 1, for example of a drawer which is mounted so that it can slide. It may, for example, be a bistable dwell mechanism which, if printing material is to be added, can be unlocked and locked as a result of actuation of the front panel 17, which therefore serves as a button. Moreover, a plurality of buttons 19, 20 and 21, 22 and 23 are mounted in the front panel 17, which is provided with a handle strip 18. These buttons, together with the buttons 5 and 8, are used to select the most important working time data for driver and second driver, to turn pages forward and back in the respective data sets of a selected type of data and to initiate printing.

FIG. 1 also shows an essential feature of the innovation, namely the fact that a section of the closure gap which exists between the cutout 16 in the front wall 3 and the front panel 17 is designed as an output slot 24 for the printed documents.

The substantially diagrammatic FIG. 2 shows partially illustrated housing components 25, 26, 27 of the tachograph 1 together with a slidably mounted drawer 28. The housing components 25, 26 and 27 are a cover part, a side wall and a base part of the tachograph 1, which are suitably connected to the front wall 2. 29 denotes a thermal print head which is arranged on a heat sink 30. The latter is spring-mounted, as diagrammatically indicated by the arrow P. A receptacle 31 formed in the sliding drawer 28 is used to loosely hold a ribbon 32 which forms the stock of printing material. Resilient fingers which are formed inside the receptacle 31 and interact with the spool 33 of the ribbon 32 to provide axial mounting for the ribbon 32 are conceivable. Between the receptacle 31 and the front panel 17 of the sliding drawer 28 there is a space 34 in which a feed roller 35 and a drive mechanism 36 which drives this roller are mounted. The motor of the drive 36 is denoted by 37. In addition, the space 34 serves to accommodate at least one printed circuit board (not shown) on which contacts associated with the buttons 19, 20, 21, 22 and 23 shown in FIG. 1 are arranged. FIG. 2 shows the sliding drawer 28 which has been pulled out of the tachograph 1 in a state after the ribbon 32 has been placed into the receptacle and, a fact which is essential to the innovation, a starting section 38 of the printing material has been laid loosely over the feed roller 35 and the front panel 17 of the sliding drawer 28. When the sliding drawer 28 is pushed into the tachograph 1 in the direction of the arrow, the feed roller 35 interacts actively with the thermal print head 29 which ultimately rests resiliently on it, the starting section 38 of the printing material being situated in the section of the closure gap which serves as an output slot 24 between the front wall 3 of the tachograph and the front panel 17 of the sliding drawer 28. In the position of the sliding drawer 28 shown in FIG. 3, the printing device is ready for printing and feeding; protruding printing material can be detached at an edge of the front panel 17 or the front wall 3 which adjoins the output slot 24. In this exemplary embodiment, the ribbon 32 is introduced into the receptacle 31 substantially from "above". In this case, on account of the insertion principle according to the innovation, it is not absolutely necessary for there to be a direct view of the receptacle 31, so that the tachograph 1 may even be fitted in the roof substructure of a vehicle. To ensure precise orientation with respect to the thermal print head 29 irrespective of the play in the guidance of the sliding drawer 28, it is expedient for the feed roller 35 to be held in a clamping device associated, for example, with the shaft 39 when the sliding drawer is being pushed in.

An arrangement of the printing device which is illustrated in the loading position in FIG. 4 and a corresponding design of the sliding drawer 40 is based on the use of a cartridge 42 accommodating a ribbon 41. This cartridge rests loosely in a chamber 42 which is formed in the sliding drawer 40 and serves as a receptacle, specifically in such a manner that the starting section 45 of the printing material, which emerges from a slot 44 formed in the cartridge 42, as opposed to the exemplary embodiment shown in FIGS. 1, 2 and 3, is pointing downward. Moreover, the cartridge 42 is inserted into the sliding drawer 40 from the side, i.e. in this exemplary embodiment there is sufficient free space available for the cartridge 42 to be pushed in from the side in virtually any installation position of the tachograph 1. Furthermore, this sliding drawer solution is distinguished by the fact that, on account of the sliding drawer 40 being closed at the top, falling dirt cannot enter the chamber 43 and a space 46 in which a feed roller 47, a drive mechanism 48 which drives the latter, a motor 49 and, if appropriate, means (not shown) for contact with buttons which can be actuated from outside a front panel 50 of the sliding drawer 40 are arranged in a similar way to the exemplary embodiment described above. Otherwise, the starting section 45 of the printing material is moved into the printing position in the same way as in the exemplary embodiment mentioned first. This means that the arrangement of the thermal print head 29 and the design of an output slot 51 have to be suitable for the feed roller 47 which engages downward with respect to the sliding drawer 40 and the starting section 45 of the printing material, which emerges at the bottom.

For the sake of completeness, it should be pointed out that the chamber 43 and an outlet opening 52 formed thereon may be designed in such a manner that it is also possible to use a ribbon which is not in a cartridge, in which case it should be ensured that the ribbon is pushed into the chamber 43 in such a manner that, when the printing material is pulled off toward the front panel 50 of the sliding drawer 40, it rotates in the anticlockwise direction. In this case, the outlet opening 52 is to be designed as a relatively narrow slot. Furthermore, in this exemplary embodiment it is also expedient to provide a clamping device which is preferably associated with the spindle of the feed roller 47, a reflection light barrier, which is arranged in front of the thermal print head in the direction in which the sliding drawer 40 is pushed in and which serves as a printing-material sensor, and a sensor which detects the closed position of the sliding drawer 40. In this case too, the sliding drawer 40 can be opened and closed by hand, if appropriate with the assistance of an auxiliary force, or under purely motor force; for manual actuation, as can be seen from FIG. 1, a suitable handle element must be provided on the front panel 50.

FIG. 5 shows a sketch of an exemplary embodiment in the loading position, in which embodiment a receptacle 53 for a ribbon 54 is formed in a fold-out drawer 55 which serves as the support. For its part, the fold-out drawer 55 is mounted in such a manner that it can pivot about a pin 56 in the front wall 3 of the tachograph 1. Since, in this solution, there is inevitably only a small space between the receptacle 53 and a front panel 57 of the fold-out drawer 55, the motor which drives the feed roller 58 and the gear mechanism which is required between this motor and the shaft 59 of the feed roller 58 are situated, although this is not shown for the sake of simplicity, in a space provided to the side of the receptacle 53, the motor being arranged in such a manner that its electrical connection lines do not move significantly when the fold-out drawer 55 pivots. This solution has the advantage that the fold-out drawer 55 can be loaded with the ribbon 54, with respect to the tachograph 1, substantially from the front, and there is no need for any free spaces above or next to the front surface of the tachograph 1, so that a tachograph 1 which is equipped in this way is suitable for virtually all installation positions which occur. A further advantage which should be mentioned is that, since the feed roller 58, the ribbon 54 and the front panel 57 must be particularly closely arranged, on account of the pivoting movement of the fold-out drawer 55, a starting section 60 of the printing material is relatively short in this exemplary embodiment and, after the ribbon 54 has been inserted, inevitably projects downward, the risk of a loop being formed when the fold-out drawer 55 is being closed is eliminated. As in the exemplary embodiment shown in FIGS. 1, 2 and 3, it is also conceivable to use a ribbon in a cartridge. Latching and stop means are provided in order to retain the fold-out drawer 55 in the closed position and to ensure a stable limitation of the movement in the open position.

FIG. 6 shows an exemplary embodiment which is in the printing and feed position and has a swing-out drawer 61 which serves as a support and can rotate about a pin which is provided parallel to the vertical axis of the housing 2. By way of example, hinge means 62 and 63 are indicated by dot-dashed lines, by means of which hinges the swing-out drawer 61 is mounted in the front wall 3 of the tachograph 1. The second side wall of the housing 2 is denoted by 64. A wall limb 69, to which a spindle 70 is attached in a floating position, is formed integrally on a front panel 65 of the swing-out drawer 61, which on the one hand serves to support the feed roller 66 and on the other hand is provided as a receptacle 67 for the ribbon 68. On the spindle 70, there are expediently means which ensure that a ribbon 68 is automatically secured in the axial direction when it is fitted onto the spindle 70. In this connection, it is conceivable to use a pawl which is spring-mounted in the spindle 70 or, since the spool 71 of the ribbon 68 is to a certain extent elastically deformable, by way of example an annular bead which is formed integrally on the spindle 70. In FIG. 6, a starting section of the printing material, which has been pulled off the ribbon 68 and is resting in an output slot 73, is denoted by 72. The output slot 73 forms a section, specifically a section which is parallel to the feed roller, of the closure gap which exists between the front wall 3 of the tachograph 1 and the swing-out drawer 61. In a similar way to that shown in the exemplary embodiment in accordance with FIG. 5, in the present exemplary embodiment the drive of the feed roller 66 may be assigned to the opposite side of the wall limb 69. FIG. 6 furthermore shows a solution in which the motor and a downstream drive mechanism 74 are arranged in a stationary position in the housing 2 of the tachograph 1 and the feed roller 66 is driven via a bevel gear mechanism. In this case, a bevel gear 75 is axially assigned to the feed roller 66 and is connected to the feed roller 66 in a manner fixed against rotation. A further bevel gear 76, which is preferably mounted on or in an extension of the rotation pin of the swing-out drawer 61 and is mechanically connected to a gear 78 of the drive mechanism 74 via crown toothing 77, is in engagement with the bevel gear 75. This geared connection allows the driving of the feed roller 66 to continue uninterrupted when the swing-out drawer 61, which is axially supported on the front wall 3 (support surface 79), is being opened and closed. Otherwise, the exemplary embodiment described above, in a similar way to the exemplary embodiment shown in FIG. 4, offers the advantage that the ribbon 68 is introduced into the receptacle 67 from the side, the swing-out drawer 61 only having to be opened through an angle of approx. 60°. By contrast to a sliding drawer as the support of the printing device, in the exemplary embodiment shown in FIG. 6 it is possible to precisely mount the swing-out drawer 61, so that there is no need for a clamping device for aligning the feed roller. It is also worth mentioning that the ribbon 68 can be mounted on a mandrel or a spindle 70 without play and therefore, as opposed to a ribbon which is resting loosely in a trough-like receptacle, movement of the ribbon 68 and substantially also of the starting section 72 of the printing material projecting from the ribbon 68 is prevented when the swing-out drawer 61 is being closed, and consequently the starting section 72 of the printing material, which projects from the ribbon 68 and in this case consistently faces downward, is also stabilized.

What is claimed is:

1. Tachograph having a printing device, which has a thermal print head and a support, which can be moved out of the front side of the housing of the tachograph, for reloading a ribbon which forms the stock of printing material, and a feed roller which is actively connected, in a force-fitting manner, to the thermal print head, with the printing material between them and is driven by a drive mechanism, characterized in that the thermal print head (29) and the feed roller (35, 47, 58, 66) can be spatially separated from one another as a result of the support being moved out of the housing (2) of the tachograph (1), and in that the thermal print head (29) and the feed roller (35, 47, 58, 66) are associated with one another in such a manner that, after a ribbon (32, 41, 54, 68) has been inserted into the support, as the support moves back into the housing (2) a starting section (38, 45, 60, 72) of the printing material, which section projects over a suitable length from the ribbon (32, 41, 54, 68), is automatically clamped between the thermal print head (29) and the feed roller (35, 47, 58, 66) and, once the support has moved back successfully, this starting section is situated between a front panel (17, 50, 57, 65), which delimits the support at the front side, and the front wall (3) of the tachograph (1).

2. Tachograph according to claim 1, characterized in that a section of the closure gap which exists between the front panel (17, 50, 57, 65) and the front wall (3), which section lies parallel to the feed roller, is designed as an output slot (24, 51, 73) for the printed documents produced.

3. Tachograph according to claim 1, characterized in that at least one of the outer edges of the output slot (24, 51, 73) is formed as a tear-off edge.

4. Tachograph according to claim 1, characterized in that the thermal print head (29) is arranged in the housing (2), in that a receptacle (31, 43) assigned to the ribbon (32, 41) is formed in the support, and in that a space (34, 46), which is used for the arrangement of the feed roller (35, 47) and the drive mechanism (36, 48) which drives the feed roller (35, 47), is provided between the receptacle (31, 43) and the front panel (17, 50) which delimits the support on the front side.

5. Tachograph according to claim 1, characterized in that the support is designed in such a manner that the drive mechanism which is used to drive the feed roller (58) is assigned a space which substantially in the axial direction of the ribbon (54) laterally adjoins the receptacle (53) of the latter.

6. Tachograph according to claim 1, characterized in that the support is designed as a fold-out drawer (55) which is mounted so that it can rotate about a pin (56) arranged at right angles to the vertical axis of the tachograph (1).

7. Tachograph according to claim 1, characterized in that the support is designed as a sliding drawer (28, 40) which can move at right angles to the front wall (3) of the tachograph (1).

8. Tachograph according to claim 7, characterized in that the ribbon (41) is accommodated in an axially slotted cartridge (42) which can be inserted into the support.

9. Tachograph according to claim 8, characterized in that the cartridge (42) is formed directly in the support which can slide/pivot relative to the tachograph (1).

10. Tachograph according to claim 1, characterized in that the support is designed as a swing-out drawer (61) which can rotate about a pin (62, 63) which is arranged parallel to the vertical axis of the tachograph (1).

11. Tachograph according to claim 1, characterized in that the support is designed in such a manner that a ribbon (41, 54, 68) can be inserted substantially transversely with respect to the vertical axis of the tachograph (1).

12. Tachograph according to claim 11, characterized in that the receptacle (67) is equipped with a spindle (70) which is assigned to the spool (71) of the ribbon (68) and is integrally formed in a floating position.

13. Tachograph according to claim 12, characterized in that a securing means, which is used to axially secure the ribbon (68) and is larger than the opening of the spool (71) of the ribbon (68), is formed at the free end of the spindle (70).

14. Tachograph according to claim 1, characterized in that with respect to the preferred installation position of the tachograph (1), the thermal print head (29), the feed roller (47, 66) and the support are arranged or designed in such a manner that the starting section (45, 72) of the printing material projects downward from the ribbon (41, 68), and in that the bottom section, which is parallel to the feed roller, of the closure gap between the front panel (50, 65) of the support and the front wall (3) of the tachograph (1) is designed as an output slot (51, 73) for the printed documents.

15. Tachograph according to claim 1, characterized in that a sensor, preferably a reflection light barrier, is provided, which when the support is moving back into the housing (2) detects a starting section (38, 45, 60, 72), which projects from the ribbon (32, 41, 54, 68), of the printing material.

16. Tachograph according to claim 1, characterized in that a clamping device associated with the shaft (39, 59) of the feed roller (35, 47, 58) is provided for the purpose of positioning the support inside the housing (2).

17. Tachograph according to claim 1, characterized in that the thermal print head (29) is spring-mounted, and in that a wedge-mechanism connection for lifting the thermal print head (29) and bringing it into active engagement with the feed roller (35, 47, 58) during the movement of the support into the housing (2) is provided between the thermal print head (29) and the support.

18. Tachograph according to claim 1, characterized in that the thermal print head (29) is assigned drive means which bring about lifting/lowering, and in that the drive means can be controlled by a sensor which senses the position of the support.

19. Tachograph according to claim 1, characterized in that the thermal print head (29) is arranged at an angle with respect to the direction of movement of the support, and in that the thermal print head (29), as the support is moving into the closed position, is lifted into the printing position by the feed roller (35, 47, 58) directly.

20. Tachograph according to claim 1, characterized in that the thermal print head (29) is mounted in such a manner in the housing (2) that, to apply the printing force, it can move substantially in the direction of movement of the support, the movement being initiated via the feed roller (66), and in that the support is assigned locking means.

21. Tachograph according to claim 1, characterized in that a cutting device assigned to the closure gap is provided.

* * * * *